US012774434B2

(12) United States Patent
Branca et al.

(10) Patent No.: US 12,774,434 B2
(45) Date of Patent: Oct. 27, 2026

(54) DETERGENT PRODUCT

(71) Applicant: The Procter & Gamble Company, Cincinnati, OH (US)

(72) Inventors: Andrea Branca, Brussels (BE); Jimmy Schoubben, Grimbergen (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 19/186,688

(22) Filed: Apr. 23, 2025

(65) Prior Publication Data

US 2025/0250064 A1 Aug. 7, 2025

Related U.S. Application Data

(63) Continuation of application No. PCT/US2023/075073, filed on Sep. 26, 2023.

(30) Foreign Application Priority Data

Oct. 26, 2022 (EP) .................................... 22203819

(51) Int. Cl.
*C11D 17/04* (2006.01)
*B32B 7/12* (2006.01)
(Continued)

(52) U.S. Cl.
CPC .............. *C11D 17/042* (2013.01); *B32B 7/12* (2013.01); *B32B 27/10* (2013.01); *B32B 27/32* (2013.01);
(Continued)

(58) Field of Classification Search
USPC ....................................................... 206/524.2
See application file for complete search history.

(56) References Cited

U.S. PATENT DOCUMENTS 3,775,239 A * 11/1973 Snow ...................... B32B 27/32 383/113
5,540,962 A * 7/1996 Suskind .................. B32B 27/32 206/812
(Continued)

FOREIGN PATENT DOCUMENTS

CN 210311581 U 4/2020
WO 2012148895 A2 11/2012
WO WO-2016166777 A1 * 10/2016 ............. B65D 31/02

OTHER PUBLICATIONS

All Office Actions; U.S. Appl. No. 19/186,693, filed Apr. 23, 2025; See Patent center.

(Continued)

*Primary Examiner* — Bryon P Gehman
(74) *Attorney, Agent, or Firm* — Elizabeth A. Conklin

(57) ABSTRACT

A detergent product includes a flexible bag and water-soluble detergent articles. The water-soluble detergent articles are contained inside the flexible bag. The flexible bag includes from about 85 wt % to about 94 wt % of a paper layer; from about 3.0 wt % to about 10.0 wt % of a polyethylene layer having a thickness of from about 6 μm to about 20 μm; and from about 3.0 wt % to about 10.0 wt % of a recloseable zipper. The polyethylene layer is coated onto the paper layer, the recloseable zipper is in contact with the polyethylene layer, and the average force required to open the recloseable zipper is less than about 4.0 newtons per centimeter.

19 Claims, 1 Drawing Sheet

(51) Int. Cl.

| | |
|---|---|
| ***B32B 27/10*** | (2006.01) |
| ***B32B 27/32*** | (2006.01) |
| ***B65D 30/08*** | (2006.01) |
| ***B65D 33/00*** | (2006.01) |
| ***B65D 33/16*** | (2006.01) |
| ***B65D 65/40*** | (2006.01) |
| ***C09D 123/06*** | (2006.01) |
| ***D21H 19/22*** | (2006.01) |
| ***D21H 27/10*** | (2006.01) |

(52) U.S. Cl.

CPC ........... *B65D 31/02* (2013.01); *B65D 33/004* (2013.01); *B65D 33/16* (2013.01); *B65D 65/40* (2013.01); *C09D 123/06* (2013.01); *D21H 19/22* (2013.01); *D21H 27/10* (2013.01); *B32B 2255/10* (2013.01); *B32B 2255/205* (2013.01); *B32B 2307/514* (2013.01); *B32B 2307/718* (2013.01); *B32B 2307/7376* (2023.05); *B32B 2439/46* (2013.01); *C11D 2111/12* (2024.01); *C11D 2111/14* (2024.01)

(56) References Cited

U.S. PATENT DOCUMENTS

| | | | | |
|---|---|---|---|---|
| 9,393,161 | B2 * | 7/2016 | Bhattacharjee ........ | B65D 33/08 |
| 9,487,333 | B2 | 11/2016 | Vanloocke et al. | |
| 2007/0177827 | A1 | 8/2007 | Tilman | |
| 2015/0238372 | A1 | 8/2015 | Bhattacharjee et al. | |
| 2017/0334608 | A1 | 11/2017 | Kruse et al. | |

OTHER PUBLICATIONS

PCT Search Report and Written Opinion for PCT/US2023/075073 dated Jan. 30, 2024, 10 pages.

Easylock 971—aplix 971, Technical Data Sheet, dated Jul. 31, 2020, 20 pages.

Kraft paper, online retrieved from "https://en.wikipedia.org/w/index.php?title=Kraft_paper&oldid=1107968263", dated Sep. 1, 2022, 04 pages.

Polyethylene, online retrieved from "https://en.wikipedia.org/w/index.php?title=Polyethylene&oldid=1117119761", dated Oct. 20, 2022, 19 pages.

Unpublished U.S. Appl. No. 19/186,693, filed Apr. 23, 2025, to Andrea Branca et. al. (See Patent center).

* cited by examiner

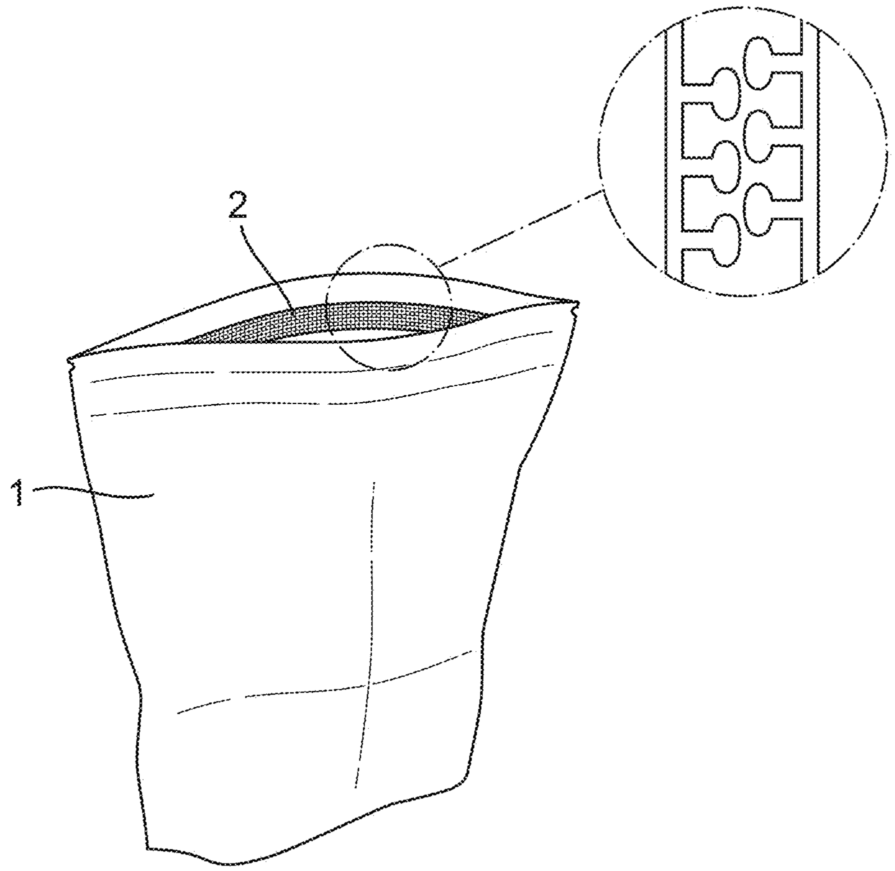
2
1

DETERGENT PRODUCT

TECHNICAL FIELD

The present invention relates to a detergent product comprising a flexible bag and water-soluble detergent articles.

BACKGROUND

Detergent manufacturers are becoming more aware of the environmental and sustainable impact their choice of packaging has on the overall environmental and sustainability profile of their detergent products. Detergent manufacturers are seeking to develop more environmentally friendly and sustainable detergent products. One approach is to use a very high percentage of paper in the detergent packaging. However, replacing existing packaging ingredients with such high amounts of paper leads to problems that need to be overcome.

One such problem is the use of recloseable zippers on the detergent packaging. Care must betaken to control the force required to open these recloseable zippers when the detergent package comprises high levels of paper. Existing zippers that are used with other materials, such as plastic, can tear from the paper-based package when the consumer attempts to open the closed zipper. There is a high risk that the zipper becomes separated from the packaging layer(s). Such broken packaging is then defect and cannot protect the detergent articles. Modification of the zipper is needed for these paper-based detergent packages, especially when the detergent articles contained therein are water-soluble, especially water-soluble detergent articles such as automatic dishwashing detergent pouches. Using recloseable zippers that require very low opening forces in such detergent packaging is advantageous.

SUMMARY

The present invention provides a detergent product comprising a flexible bag and water-soluble detergent articles, wherein the water-soluble detergent articles are contained inside the flexible bag, wherein the flexible bag comprises:

(a) from 85 wt % to 94 wt % of a paper layer;

(b) from 3.0 wt % to 10.0 wt % of polyethylene layer having a thickness of from 6 μm to 20 μm; and (c) from 3.0 wt % to 10.0 wt % recloseable zipper, wherein the polyethylene layer is coated onto the paper layer, wherein the recloseable zipper is in contact with the polyethylene layer, and wherein the average force required to open the recloseable zipper is less than 4.0 newtons per centimeter.

BRIEF DESCRIPTION OF THE DRAWINGS

FIG. 1 illustrates the flexible bag showing the outer bag layer (1) and the recloseable zipper (2).

DETAILED DESCRIPTION OF THE INVENTION

Detergent Product

The detergent product comprises a flexible bag and water-soluble detergent articles. The water-soluble detergent articles are contained inside the flexible bag. The flexible bag can comprise:

(a) from 85 wt % to 94 wt % of a paper layer;

(b) from 3.0 wt % to 10.0 wt % of polyethylene layer having a thickness of from 6 μm to 20 μm; and (c) from 3.0 wt % to 10.0 wt % recloseable zipper.

The polyethylene layer is coated onto the paper layer. The recloseable zipper is in contact with the polyethylene layer. The average force required to open the recloseable zipper is less than 4.0 newtons per centimeter.

Flexible Bag

The flexible bag comprises:

(a) from 85 wt % to 94 wt % (by weight of the flexible bag) of a paper layer;

(b) from 3.0 wt % to 10.0 wt % (by weight of the flexible bag) of a polyethylene layer having a thickness of from 6 μm to 20 μm; and (c) from 3.0 wt % to 10.0 wt % (by weight of the flexible bag) of a recloseable zipper.

The polyethylene layer is coated onto the paper layer. The recloseable zipper is in contact with the polyethylene layer. The average force required to open the recloseable zipper is less than 4.0 newtons per centimeter.

Preferably, there is no adhesive between the paper layer and polyethylene layer.

Preferably, the recloseable zipper is heat sealed to the polyethylene layer. Typically, the strength of the heat seal between the recloseable zipper and the polyethylene layer is from 10 N/inch to 40 N/inch, preferably from 20 N/inch to 30 N/inch. to Y.

Preferably, the recloseable zipper is located from 0.1 cm to 0.5 cm from the top of the flexible bag, this distance is typically from the top of the zipper to the top of the bag.

Preferably, the flexible bag does not comprise any tear opening strips.

Preferably, the flexible bag comprises at least 90 wt % of a paper layer, or from 90 wt % to 94 wt % paper layer, or from greater than 90 wt % to 94 wt % paper layer.

Preferably, the flexible bag comprises from 4.0 wt % to 8.0 wt % of a polyethylene layer.

Preferably, the flexible bag comprises from 4.0 wt % to 8.0 wt % recloseable zipper.

The flexible bag may comprise an adhesive strip, typically located on the inside of the bag. The adhesive strip may preferably comprise a perfume.

The adhesive strip can be any size or shape. Those skilled in the art will be aware of suitable sizes and shapes and how the appropriate choice of size and shape can contribute to the perfume release kinetics profile from the adhesive strip, for example, the larger the adhesive strip-air contact area the higher the perfume intensity build-up and the shorter the perfume longevity profile. Preferably, the adhesive strip is between 0.01 g and 5 g, preferably between 0.05 g and 2 g, more preferably between 0.1 g and 1 g, most preferably between 0.2 g and 0.5 g. The adhesive strip may be rectangular, square, oval, circular or a mixture thereof.

Preferably, the adhesive strip is a hot melt adhesive strip.

The adhesive strip preferably comprises a perfume. Preferably, the adhesive strip comprises between 10% and 80%, preferably between 20% and 70%, more preferably between 30% and 60%, most preferably between 40% and 55% by weight of the adhesive strip of the perfume.

Preferably, the adhesive strip comprises a copolymer of ethylene with at least another monomer comprising at least a heteroatom. All copolymers of ethylene with at least another monomer comprising at least a heteroatom are suitable for use herein. The copolymer of ethylene with at least another monomer comprising at least a heteroatom should be understood to also include blends of copolymers. The copolymer of ethylene with at least another monomer comprising at least a heteroatom is preferably present from 10% to 80%, more preferably from 15% to 60%, even more preferably from 20% to 50%, most preferably from 20% to 30% by weight of the adhesive strip.

The term “monomer comprising at least a heteroatom” includes all those monomers which comprise at least a C—X linkage wherein X is not C or H. Said C—X linkage is preferably a polar linkage. Preferably the carbon atom is linked to an N, S, F, Cl or O atom. More preferably said polar linkage is part of a carbonyl group and, more preferably, of an ester group. Preferred monomers comprising at least a heteroatom for the present invention are vinyl acetate, vinyl alcohol, methyl acrylate, ethyl acrylate, butyl acrylate, acrylic acid and salts formed therefrom, methacrylic acid and salts formed therefrom, maleic anhydride, glycidyl methacrylate and carbon monoxide. Suitable copolymers for use herein can be both block and non-block copolymers, grafted copolymers, copolymers with side chains, cross-linked copolymers and copolymers where ethylene monomers are randomly copolymerized with monomers comprising at least a heteroatom. Preferred copolymers of ethylene include ethylene-vinyl ester copolymers, ethylene-acrylic ester copolymers, ethylene-methacrylic ester copolymers, ionomers, ethylene-acrylic acid copolymers, ethylene-methacrylic acid copolymers, ethylene-vinyl ester-acrylic acid copolymers, vinyl ester-methacrylic acid copolymers, ethylene-vinyl ester-maleic anhydride copolymers, ethylene-acrylic ester-maleic anhydride copolymers, ethylene-vinyl ester-glycidyl methacrylate copolymers, ethylene-acrylic ester-glycidyl methacrylate copolymers, ethylene-maleic anhydride copolymers, ethylene-glycidyl methacrylate copolymers and mixtures thereof. More preferably the copolymer is an ethylene-vinyl ester copolymer or an ethylene-acrylic ester copolymer, most preferably an ethylene—vinyl acetate copolymer. The monomer comprising at least a heteroatom in the copolymers suitable for the present invention preferably represents from 10% to 80%, preferably from 15% to 60%, more preferably from 20% to 40% of the total weight of the copolymer. Particularly preferred copolymers include ethylene-vinyl acetate copolymers such as those sold under the trade names Elvax™ by Dupont, Evathane™ by Atofina, Escorene™ by Exxon and Levapren™ and Levamelt™ by Bayer, and ethylene-acrylic ester copolymers such as those sold under the trade name LotryP™ by Atofina. Most preferred copolymers for use are ethylene-vinyl acetate copolymers sold under the trade name Elvax™ from Dupont, especially Elvax™250, Elvax™265, Elvax™40W, and mixtures thereof, most preferably Elvax™250. Elvax™250, a poly(ethylene-co-vinyl acetate) with a vinyl acetate content of 28 wt %, a density of 0.95 $g/cm^3$ (ASTM D792), a melting point of 70° C. (ASTM D3418), a melt flow rate (190° C./2.16 kg) of 25 g/10 min (ASTM D1238) and a Vicat Softening Point of 42° C. (ASTM D1525).

Preferably, the adhesive strip comprises a plasticizer. The plasticizer should be understood to include mixtures of plasticizers. Preferably, the plasticizer comprises at least one heteroatom, wherein the heteroatom is compatible with the copolymer of ethylene with at least another monomer comprising at least a heteroatom. The term “plasticizer comprising at least a heteroatom” includes all those plasticizers which comprise at least a C—X linkage in the molecule wherein X is not C or H. Said C—X linkage is preferably a polar linkage. Preferably the carbon atom is linked to a N, S, F, Cl or O atom. More preferably said polar linkage is part of a carbonyl group and, more preferably, of an ester group. The plasticizer is preferably present in the adhesive strip between 1% and 50%, preferably between 2% to 35%, more preferably between 3 and 25%, most preferably between 4% and 10% by weight of the adhesive strip. The different polarity of the different compatible plasticisers (measurable with any method known to those skilled in the art, for example water/octanol partition coefficient) can be used to tune the polarity of the polymeric matrix in order to provide a better match with the polarity of the volatile perfume material. Suitable plasticizers for use herein include citric acid esters, low molecular weight polyesters, polyethers, liquid rosin esters, aromatic sulfonamides, phthalates, benzoates, sucrose esters, derivatives of polyfunctional alcohols (where polyfunctional means having 2 or more hydroxyl groups), adipates, tartrates, sebacates, esters of phosphoric acid, fatty acids and diacids, fatty alcohols and diols, epoxidized vegetable oils, and mixtures thereof. Preferably the plasticizer is an ester compound, more preferably selected from citric acid esters and liquid rosin esters, most preferably liquid rosin esters. Suitable plasticizers for use are Citrofol™ BII (tributyl O-acetylcitrate, ATBC) and Foralyn™ 5020-F (methyl ester of hydrogenated rosin, Eastman), preferably Foralyn™ 5020-F.

The polymeric adhesive strip may comprise additional optional components to further improve the processability of the compositions and also the mechanical characteristics as well as other characteristics as tackiness, resistance to ageing by light, oxygen and heat, visual appearance of the objects formed from such polymeric compositions. One such optional component may include other copolymers that can be included in the formulations to improve their properties for example to increase adhesion or compatibility with substrates, e.g. so called tackifiers.

The adhesive strip may comprise a tackifer. Preferably, the adhesive strip comprises between 1% and 50%, preferably between 2% and 35%, more preferably between 3-25%, most preferably between 10 and 20% by weight of the adhesive strip of a tackifier. Preferably, the tackifier is selected from copolymers of styrene and at least one other vinyl or acrylic monomer, copolymers of poly(vinyl alcohol), polyamides, polyether amide copolymers, polyester amide copolymers, polyesters, polyether ester copolymers, polyurethanes, polyethers, poly(2-ethyl-2-oxazoline), copolymers of poly(vinyl pyrrolidone), polyacrylates, copolymers of polyvinyl ethers), hydrocarbon resins, hydrogenated rosins, and mixtures thereof. Suitable tackifiers include Kristalex™ F85 (hydrocarbon resin, Eastman) and Foral™ AX-E (fully hydrogenated rosin, Eastman), preferably Kristalex™ F85.

The adhesive strip may comprise an antioxidant, preferably in an amount between 0.001% and 1%, preferably between 0.01% and 0.5%, more preferably between 0.05% and 0.25%, most preferably between 0.075% and 0.15% by weight of the adhesive strip. Most preferred antioxidants include phenolic antioxidants and mixtures thereof. Suitable antioxidants include Irganox™ 1076 (Octadecyl-3-(3,5-di-tert.-butyl-4-hydroxyphenyl)-propionate, BASF) and Irganox™ B225 (a blend of 50% Irgafos™ 168—Tris(2,4-di-tert.-butylphenyl)phosphite and 50% Irganox™ 1010—Pentaerythritol tetrakis(3-(3,5-di-tert-butyl-4-hydroxyphenyl)propionate), BASF), most preferably Irganox™ 1076.

Preferably, the adhesive strip comprises between 40% and 55% of a perfume, between 20% and 30% of an ethylene-vinyl acetate copolymer, between 4% and 10% of a plasticizer, between 10% and 20% of a tackifier and between 0.075% and 0.15% of an antioxidant, all % by weight of the adhesive strip.

Those skilled in the art will be well aware of how to make an adhesive strip according to the present invention.

The preferred hot melt adhesive compositions for use herein, due to their rheology and to their adhesion properties, are particularly useful to be applied in the molten state onto a selected substrate, and directly adhered thereto. The polymeric composition can be applied by means of a conventional hot melt delivery system. This system typically includes a melting unit, which maintains the hot melt at the temperature required to have a processable viscosity. The melting unit typically contains a pumping system capable of pumping the hot melt through a length of hose until it reaches the glue gun, or nozzle. The nozzle can have different geometries according to the desired application form of the glue (coatings, stripes, beads etc). Typically, a slot nozzle can be used as the glue gun.

Paper Layer

A suitable paper layer has a thickness of from 50 μm to 200 μm.

A suitable paper layer has a weight of from 70 grams per square meter (gsm) to 200 μm, or from 70 μm to 170 μm, or even from 70 μm to 150 μm.

The paper layer can be pre-treated. Suitable pre-treatments include bleaching, filling, contrast enhancing, or any combination thereof.

A n illustration can be printed onto the paper layer.

A preferred paper layer can comprise kraft paper.

The paper layer can comprise recycled paper.

Polyethylene Layer

Any suitable polyethylene can be used. Suitable polyethylene is selected from: ultra high molecular weight polyethylene; ultra low molecular weight polyethylene; high molecular weight polyethylene; high density polyethylene (HDPE); high density cross-linked polyethylene; cross-linked polyethylene; medium-density polyethylene; linear low density polyethylene (LLDPE); low density polyethylene (LDPE); very low density polyethylene; chlorinated polyethylene; and any combination thereof.

Preferred polyethylene is selected from: high density polyethylene (HDPE); linear low density polyethylene (LLDPE); low density polyethylene (LDPE); and any combination thereof.

A particularly preferred polyethylene is selected from: high density polyethylene (HDPE); low density polyethylene (LDPE); and any combination thereof.

A particularly preferred polyethylene is low density polyethylene (LDPE).

Recloseable Zipper

The average force required to open the recloseable zipper is less than 4.0 newtons per centimeter, preferably less than 3.0 newtons per centimeter, and preferably from 1.0 newtons per centimeter to less than 4.0 newtons per centimeter, more preferably from 1.0 newtons per centimeter to 3.0 newtons per centimeter.

Preferably, the zipper is a hook-hook zipper. A suitable hook-hook zipper comprises at least three rows of hooks, preferably at least four rows of hooks, preferably at least five rows of hooks, preferably at least six rows of hooks, and preferably from three to twenty rows of hooks, or from three to ten rows of hooks, or from four to eight rows of hooks. Typically, the rows of hooks are positioned one on top of each other in the vertical plane, with each row running substantially across the width of the flexible bag in the horizontal plane.

Preferably, the hooks are mushroom shaped. Suitable mushroom shaped hooks have a maximum diameter at the head and a minimum diameter at the stalk. Suitable mushroom shaped stalks have a ratio of maximum diameter to minimum diameter of from greater than 1.0:1 to 3.0:1, preferably from 1.5:1 to 2.0:1. Typically, decreasing this ratio lowers the force required to open the zipper. Preferably, the diameter of the head of the mushroom shaped hook is from 0.5 mm to 0.8 mm, the diameter of the stalk of the mushroom shaped hook is from 0.2 mm to 0.4 mm, and preferably the height of the mushroom shaped hook is from 0.5 mm to 1.0 mm.

Preferably, the recloseable zipper is made from polyethylene.

Water-Soluble Detergent Article

The water-soluble detergent article can be a dishwashing detergent pouch or a laundry detergent pouch, preferably an automatic dishwashing detergent pouch.

Dishwashing Detergent Pouch

The automatic dishwashing cleaning composition of the invention is preferably presented in unit-dose form and it can be in any physical form including solid, liquid and gel form. The composition of the invention is very well suited to be presented in the form of a multi-compartment pack, more in particular a multi-compartment pack comprising compartments with compositions in different physical forms, for example a compartment comprising a composition in solid form and another compartment comprising a composition in liquid form. The composition is preferably enveloped by a water-soluble film such as polyvinyl alcohol. Especially preferred are compositions in unit dose form wrapped in a polyvinyl alcohol film having a thickness of less than 100 μm. The detergent composition of the invention weighs from about 8 to about 25 grams, preferably from about 10 to about 20 grams. This weight range fits comfortably in a dishwasher dispenser. Even though this range amounts to a low amount of detergent, the detergent has been formulated in a way that provides all the benefits mentioned herein above. Alternatively, the composition can be provided in a pack comprising a plurality of doses and the cleaning composition can be autodosed into the dishwasher.

The composition is preferably phosphate free. By "phosphate-free" is herein understood that the composition comprises less than 1%, preferably less than 0.1% by weight of the composition of phosphate.

Terpolymer

The detergent composition may comprise a terpolymer. Suitable terpolymers comprise monomers of a vinyl lactam, monomers of (meth)acrylic acid and monomers of a linear or branched C1-C20 alkyl (meth)acrylate. Preferably, the terpolymer comprises monomers of vinylpyrrolidone, monomers of acrylic acid and monomers of a linear or branched C1-C20 alkyl (meth)acrylate. Preferably, the terpolymer comprises: i) from about 20% to about 90%, preferably from about 40 to about 70% by weight of vinylpyrrolidone, ii) from about 1 to about 55%, preferably from about 15 to 40% by weight of (meth)acrylic acid; and iii) from about 1 to about 25%, preferably from about 5 to about 20% by weight of a linear or branched C1-C20 alkyl (meth)acrylate. Preferably, the terpolymer has a weight average molecular weight of from about 10000 gmol-1 to about 2000000 gmol-1 as measured via appropriate techniques. A preferred linear or branched C1-C20 alkyl (meth)acrylate is lauryl methacrylate. Terpolymers suitable for use herein include Styleze 2000 and Acrylidone LM, both provided by Ashland. Preferably, the composition of the invention comprises from about 0.1% to about 10%, preferably from about 0.2% to about 5% by weight of the composition of terpolymer.

Non-Ionic Surfactant

Surfactants suitable for use herein include non-ionic surfactants, preferably the compositions are free of any other surfactants. Traditionally, non-ionic surfactants have been used in automatic dishwashing for surface modification purposes in particular for sheeting to avoid filming and spotting and to improve shine. It has been found that non-ionic surfactants can also contribute to prevent redeposition of soils.

Preferably the composition comprises a non-ionic surfactant, preferably a non-ionic surfactant system, more preferably the non-ionic surfactant or a non-ionic surfactant system has a phase inversion temperature, as measured at a concentration of 1% in distilled water, between 20 and 70° C., preferably between 35 and 65° C. By a "non-ionic surfactant system" is meant herein a mixture of two or more non-ionic surfactants. Preferred for use herein are non-ionic surfactant systems. They seem to have improved cleaning and finishing properties and better stability in product than single non-ionic surfactants.

Phase inversion temperature is the temperature below which a surfactant, or a mixture thereof, partitions preferentially into the water phase as oil-swollen micelles and above which it partitions preferentially into the oil phase as water swollen inverted micelles. Phase inversion temperature can be determined visually by identifying at which temperature cloudiness occurs.

The phase inversion temperature of a non-ionic surfactant or system can be determined as follows: a solution containing 1% of the corresponding surfactant or mixture by weight of the solution in distilled water is prepared. The solution is stirred gently before phase inversion temperature analysis to ensure that the process occurs in chemical equilibrium. The phase inversion temperature is taken in a thermostable bath by immersing the solutions in 75 mm sealed glass test tube. To ensure the absence of leakage, the test tube is weighed before and after phase inversion temperature measurement. The temperature is gradually increased at a rate of less than 1° C. per minute, until the temperature reaches a few degrees below the pre-estimated phase inversion temperature. Phase inversion temperature is determined visually at the first sign of turbidity.

Suitable nonionic surfactants include: i) ethoxylated non-ionic surfactants prepared by the reaction of a monohydroxy alkanol or alkyphenol with 6 to 20 carbon atoms with preferably at least 3 moles particularly preferred at least 5 moles, and still more preferred at least 7 moles of ethylene oxide per mole of alcohol or alkylphenol; ii) alcohol alkoxylated surfactants having from 6 to 20 carbon atoms and at least one ethoxy and propoxy group. Preferred for use herein are mixtures of surfactants i) and ii).

Other suitable non-ionic surfactants are epoxy-capped poly(oxyalkylated) alcohols represented by the formula:

$$R1O[CH2CH(CH3)O]x[CH2CH2O]y[CH2CH(OH)R2] \quad (I)$$

wherein R1 is a linear or branched, aliphatic hydrocarbon radical having from 4 to 18 carbon atoms; R2 is a linear or branched aliphatic hydrocarbon radical having from 2 to 26 carbon atoms; x is an integer having an average value of from 0.5 to 1.5, more preferably about 1; and y is an integer having a value of at least 15, more preferably at least 20.

Preferably, the surfactant of formula I, has at least about 10 carbon atoms in the terminal epoxide unit [CH2CH(OH) R2]. Suitable surfactants of formula I, according to the present invention, are Olin Corporation's POLY-TERGENT® SLF-18B nonionic surfactants, as described, for example, in WO 94/22800, published Oct. 13, 1994 by Olin Corporation.

Preferably, the non-ionic surfactant is a surfactant system comprising at least two non-ionic surfactants. Preferably at least one of the non-ionic surfactants of the surfactant system is an ethoxylated alcohol which comprises from 5 to 25 moles of ethylene oxide per mole of surfactant, more preferably the surfactant system also comprises an alkoxylated alcohol comprising ethoxy and propoxy groups. Preferably, the weight ratio of the two non-ionic surfactants, i.e. ethoxylated alcohol to alkoxylated alcohol comprising ethoxy and propoxy groups is from 2:1 to 1:2.

The composition typically comprises from about 0.1 to about 25% by weight of the composition, more preferably from about 0.5 to about 20% by weight of the composition of non-ionic surfactant.

Complexing Agent

Excellent drying and shine benefits are obtained with compositions comprising a dispersant polymer and/or a complexing agent. For the purpose of this invention a "complexing agent" is a compound capable of binding polyvalent ions such as calcium, magnesium, lead, copper, zinc, cadmium, mercury, manganese, iron, aluminium and other cationic polyvalent ions to form a water-soluble complex.

Preferably, the composition comprises an amino-carboxylated complexing agent, preferably selected from the group consisting of methyl-glycine-diacetic acid (MGDA), its salts and derivatives thereof, glutamic-N,N-diacetic acid (GLDA), its salts and derivatives thereof, iminodisuccinic acid (IDS), its salts and derivatives thereof, carboxy methyl inulin, its salts and derivatives thereof, citric acid its salts and derivatives thereof; and mixtures thereof. Especially preferred complexing agent for use herein is selected from the group consisting of MGDA and salts thereof, especially preferred for use herein is the trisodium salt of MGDA. Preferably, the complexing agent is the trisodium salt of MGDA and the dispersant polymer is a sulfonated polymer, more preferably comprising 2-acrylamido-2-methylpropane sulfonic acid monomer. Mixtures of salts of MGDA and salts of citric acid are also preferred for use herein.

The composition of the invention preferably comprises from 10% to 60%, preferably from 20% to 40%, more preferably from 20% to 35% by weight of the composition of a complexing agent.

Dispersant Polymer

The dispersant polymer, if present, is used in any suitable amount from about 0.1% to about 30%, preferably from 0.25% to about 20%, more preferably from 0.5% to 15% by weight of the composition. Sulfonated/carboxylated polymers are particularly suitable for the composition of the invention.

Suitable sulfonated/carboxylated polymers described herein may have a weight average molecular weight of less than or equal to about 100,000 Da, or less than or equal to about 75,000 Da, or less than or equal to about 50,000 Da, or from about 3,000 Da to about 50,000, preferably from about 5,000 Da to about 45,000 Da.

Preferred sulfonated monomers include one or more of the following: 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3-methacrylamido-2-hydroxy-propanesulfonic acid, allylsulfonic acid, methallylsulfonic acid, allyloxybenzenesulfonic acid, methallyloxybenzene-sulfonic acid, 2-hydroxy-3-(2-propenyloxy) propanesulfonic acid, 2-methyl-2-propen-1-sulfonic acid, styrenesulfonic acid, vinylsulfonic acid, 3-sulfopropyl, 3-sulfo-propylmethacrylate, sulfomethacrylamide, sulfomethylmethacrylamide and mixtures of said acids or their water-soluble salts.

Preferably, the polymer comprises the following levels of monomers: from about 40 to about 90%, preferably from about 60 to about 90% by weight of the polymer of one or more carboxylic acid monomer; from about 5 to about 50%, preferably from about 10 to about 40% by weight of the polymer of one or more sulfonic acid monomer; and optionally from about 1% to about 30%, preferably from about 2 to about 20% by weight of the polymer of one or more non-ionic monomer. An especially preferred polymer comprises about 70% to about 80% by weight of the polymer of at least one carboxylic acid monomer and from about 20% to about 30% by weight of the polymer of at least one sulfonic acid monomer.

In the polymers, all or some of the carboxylic or sulfonic acid groups can be present in neutralized form, i.e. the acidic hydrogen atom of the carboxylic and/or sulfonic acid group in some or all acid groups can be replaced with metal ions, preferably alkali metal ions and in particular with sodium ions.

The carboxylic acid is preferably (meth)acrylic acid. The sulfonic acid monomer is preferably 2-acrylamido-2-propanesulfonic acid (AMPS).

Preferred commercial available polymers include: A Icosperse 240 and A quatreat AR 540 supplied by Nouryon; Acumer 3100, Acumer 2000, Acusol 587G and Acusol 588G supplied by Dow. Particularly preferred polymers are Acusol 587G and Acusol 588G supplied by Dow.

Suitable polymers include anionic carboxylic polymer of low molecular weight. They can be homopolymers or copolymers with a weight average molecular weight of less than or equal to about 200,000 g/mol, or less than or equal to about 75,000 g/mol, or less than or equal to about 50,000 g/mol, or from about 3,000 to about 50,000 g/mol, preferably from about 5,000 to about 45,000 g/mol. The dispersant polymer may be a low molecular weight homopolymer of polyacrylate, with an average molecular weight of from 1,000 to 20,000, particularly from 2,000 to 10,000, and particularly preferably from 3,000 to 5,000.

The polymer may be a copolymer of acrylic with methacrylic acid, acrylic and/or methacrylic with maleic acid, and acrylic and/or methacrylic with fumaric acid, with a molecular weight of less than 70,000. Their molecular weight ranges from 2,000 to 80,000 and more preferably from 20,000 to 50,000 and in particular 30,000 to 40,000 g/mol. and a ratio of (meth)acrylate to maleate or fumarate segments of from 30:1 to 1:2.

The polymer may be a copolymer of acrylamide and acrylate having a molecular weight of from 3,000 to 100,000, alternatively from 4,000 to 20,000, and an acrylamide content of less than 50%, alternatively less than 20%, by weight of the dispersant polymer can also be used. Alternatively, such polymer may have a molecular weight of from 4,000 to 20,000 and an acrylamide content of from 0% to 15%, by weight of the polymer.

Polymers suitable herein also include itaconic acid homopolymers and copolymers.

Alternatively, the polymer can be selected from the group consisting of alkoxylated polyalkyleneimines, alkoxylated polycarboxylates, polyethylene glycols, styrene co-polymers, cellulose sulfate esters, carboxylated polysaccharides, amphiphilic graft copolymers and mixtures thereof.

Bleach

The composition of the invention preferably comprises from about 1 to about 30%, more preferably from about 2 to about 25%, even more preferably from about 5 to about 20% of bleach by weight of the composition.

Inorganic and organic bleaches are suitable for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated. Suitable coatings include sodium sulphate, sodium carbonate, sodium silicate and mixtures thereof. Said coatings can be applied as a mixture applied to the surface or sequentially in layers.

Alkali metal percarbonates, particularly sodium percarbonate is the preferred bleach for use herein. The percarbonate is most preferably incorporated into the products in a coated form which provides in-product stability.

Potassium peroxymonopersulfate is another inorganic perhydrate salt of utility herein.

Typical organic bleaches are organic peroxyacids, especially dodecanediperoxoic acid, tetradecanediperoxoic acid, and hexadecanediperoxoic acid. Mono- and diperazelaic acid, mono- and diperbrassylic acid are also suitable herein. Diacyl and Tetraacylperoxides, for instance dibenzoyl peroxide and dilauroyl peroxide, are other organic peroxides that can be used in the context of this invention.

Further typical organic bleaches include the peroxyacids, particular examples being the alkylperoxy acids and the arylperoxy acids. Preferred representatives are (a) peroxybenzoic acid and its ring-substituted derivatives, such as alkylperoxybenzoic acids, but also peroxy-α-naphthoic acid and magnesium monoperphthalate, (b) the aliphatic or substituted aliphatic peroxy acids, such as peroxylauric acid, peroxystearic acid, s-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates, and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi (6-aminopercaproic acid).

Bleach Activators

Bleach activators are typically organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 12 carbon atoms, in particular from 2 to 10 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), decanoyloxybenzoic acid (DOBA), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC). If present the composition of the invention comprises from 0.01 to 5%, preferably from 0.2 to 2% by weight of the composition of bleach activator, preferably TA ED.

Bleach Catalyst

The composition herein preferably contains a bleach catalyst, preferably a metal containing bleach catalyst. More preferably the metal containing bleach catalyst is a transition metal containing bleach catalyst, especially a manganese or cobalt-containing bleach catalyst.

Bleach catalysts preferred for use herein include manganese triazacyclononane and related complexes; Co, Cu, Mn and Fe bispyridylamine and related complexes; and pentamine acetate cobalt(III) and related complexes.

Preferably the composition of the invention comprises from 0.001 to 0.5%, more preferably from 0.002 to 0.05% of bleach catalyst by weight of the composition. Preferably the bleach catalyst is a manganese bleach catalyst.

Inorganic Builder

The composition preferably comprises an inorganic builder. Suitable inorganic builders are selected from the group consisting of carbonate, silicate and mixtures thereof. Especially preferred for use herein is sodium carbonate. Preferably the composition of the invention comprises from 5 to 50%, more preferably from 10 to 40% and especially from 15 to 30% of sodium carbonate by weight of the composition.

Enzymes

In describing enzyme variants herein, the following nomenclature is used for ease of reference: Original amino acid(s):position(s):substituted amino acid(s). Standard enzyme IUPAC 1-letter codes for amino acids are used.

Proteases

Suitable proteases include metalloproteases and serine proteases, including neutral or alkaline microbial serine proteases, such as subtilisins (EC 3.4.21.62) as well as chemically or genetically modified mutants thereof. Suitable proteases include subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii.*

Especially preferred proteases for the detergent of the invention are polypeptides demonstrating at least 90%, preferably at least 95%, more preferably at least 98%, even more preferably at least 99% and especially 100% identity with the wild-type enzyme from *Bacillus lentus*, comprising mutations in one or more, preferably two or more and more preferably three or more of the following positions, using the BPN' numbering system and amino acid abbreviations as illustrated in WO00/37627, which is incorporated herein by reference: V68A, N87S, S99D, S99SD, S99A, S101G, S101M, S103A, V104N/I, G118V, G118R, S128L, P129Q, S130A, Y167A, R170S, A 194P, V2051 and/or M 2225.

Most preferably the protease is selected from the group comprising the below mutations (BPN' numbering system) versus either the PB92 wild-type (SEQ ID NO: 2 in WO 08/010925) or the subtilisin 309 wild-type (sequence as per PB92 backbone, except comprising a natural variation of N87S).

(i) G118V+S128L+P129Q+S130A (ii) S101M+G118V+S128L+P129Q+S130A (iii) N76D+N87R+G118R+S128L+P129Q+S130A+S188D+N248R (iv) N76D+N87R+G118R+S128L+P129Q+S130A+S188D+V244R (v) N76D+N87R+G118R+S128L+P129Q+S130A (vi) V68A+N87S+S101G+V104N Suitable commercially available protease enzymes include those sold under the trade names Savinase®, Polarzyme®, Kannase®, Ovozyme®, Everlase® and Esperase® by Novozymes A/S (Denmark), those sold under the tradename Properase®, Purafect®, Purafect Prime®, Purafect Ox®, FN3®, FN4®, Excellase®, Ultimase® and PurafectOX P® by Genencor International, those sold under the tradename Opticlean® and Optimase® by Solvay Enzymes, those available from Henkel/Kemira, namely BLAP.

Preferred levels of protease in the product of the invention include from about 0.1 to about 10, more preferably from about 0.5 to about 7 and especially from about 1 to about 6 mg of active protease.

Amylases

Preferred enzyme for use herein includes alpha-amylases, including those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375 (U.S. Pat. No. 7,153,818) DSM 12368, DSMZ no. 12649, KSM AP1378 (WO 97/00324), KSMK36 or KSMK38 (EP 1,022,334). Preferred amylases include:

(a) the variants described in U.S. Pat. No. 5,856,164 and WO 99/23211, WO 96/23873, WO 00/60060 and WO 06/002643, especially the variants with one or more substitutions in the following positions versus the AA 560 enzyme listed as SEQ ID No. 12 in WO 06/002643: 9, 26, 30, 33, 82, 37, 106, 118, 128, 133, 149, 150, 160, 178, 182, 186, 193, 195, 202, 214, 231, 256, 257, 258, 269, 270, 272, 283, 295, 296, 298, 299, 303, 304, 305, 311, 314, 315, 318, 319, 320, 323, 339, 345, 361, 378, 383, 419, 421, 437, 441, 444, 445, 446, 447, 450, 458, 461, 471, 482, 484, preferably that also contain the deletions of D183* and G184*.

(b) variants exhibiting at least 95% identity with the wild-type enzyme from *Bacillus* sp. 707 (SEQ ID NO:7 in U.S. Pat. No. 6,093,562), especially those comprising one or more of the following mutations M202, M208, S255, R172, and/or M261. Preferably said amylase comprises one of M202L or M 202T mutations.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, POWERASE®, FUNGAMYL® and BAN® (Novozymes A/S, Bagsvaerd, Denmark), KEMZYM®AT 9000 Biozym Biotech Trading GmbH Wehlistrasse 27b A-1200 Wien Austria, RAPIDASE®, PURASTAR®, ENZYSIZE®, OPTISIZE HT PLUS® and PURASTAR OXAM® (Genencor International Inc., Palo Alto, California) and KAM® (Kao, 14-10 Nihonbashi Kayabacho, 1-chome, Chuo-ku Tokyo 103-8210, Japan). Amylases especially preferred for use herein include NATALASE®, STAINZYME®, STAINZYME PLUS®, POWERASE® and mixtures thereof.

Preferably, the product of the invention comprises at least 0.01 mg, preferably from about 0.05 to about 10, more preferably from about 0.1 to about 6, especially from about 0.2 to about 5 mg of active amylase.

Preferably, the protease and/or amylase of the composition are in the form of granulates, the granulates comprise less than 29% of sodium sulfate by weight of the granulate or the sodium sulfate and the active enzyme (protease and/or amylase) are in a weight ratio of less than 4:1.

Alkoxylated Polyalkyleneimine

The composition preferably comprises an alkoxylated polyalkyleneimine, more preferably comprises polyethyleneimine and even more preferably it is an ethoxylated polyethyleneimine. Preferably the composition of the invention comprises from 0.1% to about 5%, preferably from about 0.2% to about 3% by weight of the composition of the polyalkyleneimine. Compositions comprising an alkoxylated polyalkyleneimine further contribute to drying and shine, in particular when the aloxylated polyalkyleneimine comprising an alkoxylated polyalkyleneimine said alkoxylated polyalkyleneimine comprising a polyalkyleneimine backbone, alkoxy chains and quaternization groups wherein the alkoxylated polyalkyleneimine has a degree of quaternization of from 40% to 98% and wherein:

i) the polyalkyleneimine backbone represents from 1% to 40% by weight of the alkoxylated polyalkyleneimine;
ii) the alkoxy chains represent from 60% to 99% by weight of the alkoxylated polyalkyleneimine.

The alkoxylation of the polyalkyleneimine backbone comprises one or two alkoxylation modifications in a nitrogen atom, depending on whether the modification occurs at an internal nitrogen atom or at a terminal nitrogen atom in the polyalkyleneimine backbone, the alkoxylation modification involves the replacement of a hydrogen atom in a polyalkyleneimine by a monoalkoxylene or a polyalkoxylene chain preferably having an average of from about 1 to about 50 alkoxy units, wherein the terminal alkoxy unit of the polyalkoxylene chain is capped with hydrogen, C1-C4 alkyl or mixtures thereof. In addition, each nitrogen atom in the alkoxylated polyalkyleneimine may carry saturated or unsaturated, linear or branched alkyl, alkylaryl or aryl substituents, or combinations thereof, preferably benzyl substituents and/or C1-C12, preferably C1-C4 alkyl, aryl or alkylaryl substituents, resulting in neutral or cationic charge on each nitrogen atom depending on its total number of substituents. These modifications may result in permanent quaternization of polyalkyleneimine backbone nitrogen atoms. The degree of permanent quaternization is at least 5%, preferably at least 20%, more preferably from at least from 40% to 100% of the polyalkyleneimine backbone nitrogen atoms.

Preferably, all the nitrogen atoms would comprise alkoxylation modification(s) although it might be possible to have polyalkyleneimines wherein only part of the nitrogen atoms have been alkoxylated.

Examples of possible modifications are herein shown, the modifications correspond to terminal nitrogen atoms in the polyethyleneimine backbone where R represents an ethylene spacer and E represents a C1-C12 alkyl unit and X— represents a suitable water soluble counterion, such as chlorine, bromine or iodine, sulphate (i.e. —O—SO3H or —O—SO3-), alkylsulfonate such as methylsulfonate, arylsulfonate such as tolylsulfonate, and alkyl sulphate, such as methosulphate (i.e. —O—SO2-OMe)).

Examples of possible modifications are shown, the modifications correspond to internal nitrogen atoms in the polyethyleneimine backbone where R represents an ethylene spacer and E represents a C1-C12 alkyl unit and X— represents a suitable water soluble counterion.

Also, for example, but not limited to, below is shown possible modifications to internal nitrogen atoms in the polyethyleneimine backbone where R represents an ethylene spacer and E represents a C1-C12 alkyl unit and X— represents a suitable water soluble counterion.

The alkoxylation modification of the polyalkyleneimine backbone may comprise the replacement of a hydrogen atom by a polyalkoxylene chain having an average of about 1 to about 50 alkoxy units, preferably from about 2 to about 40 alkoxy units, more preferably from about 3 to about 30 units and especially from about 3 to about 20 alkoxy units. The alkoxy units are preferably selected from ethoxy (EO), 1,2-propoxy (1,2-PO), butoxy (BO), and combinations thereof. Preferably, the polyalkoxylene chain is selected from ethoxy units and a combination of ethoxy and propoxy units. More preferably, the polyalkoxylene chain comprises ethoxy units in an average degree of from about 1 to about 50, more preferably from about 2 to about 40 and especially from about 3 to 20. Polyalkyleneimines comprising this degree of ethoxy units have been found to provide best performance in terms of removal of bleachable stains, in particular tea and coffee stains. Also preferred in terms of bleachable stain removal are polyalkoxylene chains comprising a mixture of ethoxy and propoxy chains, preferably the polyalkoxylene chain comprises ethoxy units in an average of from about 1 to about 30 and more preferably propoxy units in an average degree of from about 0 to about 10, more preferably from about 2 to about 20 ethoxy units and from about 1 to about 10 propoxy units.

Crystal Growth Inhibitor

Crystal growth inhibitors are materials that can bind to calcium carbonate crystals and prevent further growth of species such as aragonite and calcite.

Especially preferred crystal growth inhibitor for use herein is HEDP (1-hydroxyethylidene 1,1-diphosphonic acid). Preferably, the composition comprises from 0.01 to 5%, more preferably from 0.05 to 3% and especially from 0.5 to 2% of a crystal growth inhibitor by weight of the product, preferably HEDP.

Metal Care Agents

Metal care agents may prevent or reduce the tarnishing, corrosion or oxidation of metals, including aluminum, stainless steel and non-ferrous metals, such as silver and copper. Preferably the composition comprises from 0.1 to 5%, more preferably from 0.2 to 4% and especially from 0.3 to 3% by weight of the product of a metal care agent, preferably the metal care agent is benzo triazole (BTA).

Glass Care Agents

Glass care agents protect the appearance of glass items during the dishwashing process. Preferably the composition of the invention comprises from 0.1 to 5%, more preferably from 0.2 to 4% and specially from 0.3 to 3% by weight of the composition of a metal care agent, preferably the glass care agent is a zinc containing material, specially hydrozincite.

The automatic dishwashing composition of the invention preferably has a pH as measured in 1% weight/volume aqueous solution in distilled water at 20° C. of from about 9 to about 12, more preferably from about 10 to less than about 11.5 and especially from about 10.5 to about 11.5.

The automatic dishwashing composition of the invention preferably has a reserve alkalinity of from about 10 to about 20, more preferably from about 12 to about 18 at a pH of 9.5 as measured in NaOH with 100 grams of product at 20° C.

Preferably, the composition of the invention comprises:

i) from 0.5 to 5% by weight of the composition of the terpolymer;
ii) from 0.5 to 20% by weight of the composition of non-ionic surfactant;
iii) from 5 to 50% by weight of the composition of a complexing agent, preferably the complexing agent comprises a salt of MGDA;
iv) enzymes, preferably an amylase and a protease;
v) optionally from 0.5 to 15% by weight of the composition of a dispersant polymer, preferably a carboxylate/sulfonate polymer;

vi) optionally from 5 to 25% by weight of the composition of bleach and more preferably a bleach catalyst;

Preferably, the composition comprises:

i) from 0.5 to 5% by weight of the composition of the terpolymer;

ii) from 0.5 to 10% by weight of the composition of non-ionic surfactant;

iii) from 5 to 50% by weight of the composition of a builder;

iv) from 5 to 50% by weight of the composition of a complexing agent, preferably the complexing agent comprises a salt of MGDA;

v) enzymes, preferably an amylase and a protease;

vi) from 0.5 to 5% by weight of the composition of a dispersant polymer, preferably a carboxylate/sulfonate polymer;

vii) optionally from 5 to 25% by weight of the composition of bleach and more preferably a bleach catalyst;

viii) a crystal growth inhibitor; and ix) optionally but preferably an alkoxylated polyalkyleneimine comprising a polyalkyleneimine backbone, alkoxy chains and quaternization groups wherein the alkoxylated polyalkyleneimine has a degree of quaternization of from 40% to 98% and wherein:

i) the polyalkyleneimine backbone represents from 1% to 40% by weight of the alkoxylated polyalkyleneimine;

ii) the alkoxy chains represent from 60% to 99% by weight of the alkoxylated polyalkyleneimine.

Laundry Detergent Pouch

In some examples a water-soluble unit dose article comprises at least one water-soluble film orientated to create at least one unit dose internal compartment, wherein the at least one unit dose internal compartment comprises a detergent composition. The water-soluble film and the detergent composition are described in more detail below. In some examples the consumer product comprises a container and at least one water-soluble unit dose article, in some cases at least two water-soluble unit dose articles, in some cases at least 20 water-soluble unit dose articles, in some cases at least 30 water-soluble unit dose articles. A water-soluble unit dose article is in some examples in the form of a pouch. A water-soluble unit dose article comprises in some examples a unitary dose of a composition as a volume sufficient to provide a benefit in an end application. The water-soluble unit dose article comprises in some examples one water-soluble film shaped such that the unit-dose article comprises at least one internal compartment surrounded by the water-soluble film. The at least one compartment comprises a cleaning composition. The water-soluble film is sealed such that the cleaning composition does not leak out of the compartment during storage. However, upon addition of the water-soluble unit dose article to water, the water-soluble film dissolves and releases the contents of the internal compartment into the wash liquor. The unit dose article may comprise more than one compartment, at least two compartments, or at least three compartments, or at least four compartments, or even at least five compartments. The compartments may be arranged in superposed orientation, i.e. one positioned on top of the other. Alternatively, the compartments may be positioned in a side-by-side orientation, i.e. one orientated next to the other. The compartments may be orientated in a 'tyre and rim' arrangement, i.e. a first compartment is positioned next to a second compartment, but the first compartment at least partially surrounds the second compartment, but does not completely enclose the second compartment. Alternatively, one compartment may be completely enclosed within another compartment. In some examples the unit dose article comprises at least two compartments, one of the compartments being smaller than the other compartment. In some examples the unit dose article comprises at least three compartments, two of the compartments may be smaller than the third compartment, and in some examples the smaller compartments being superposed on the larger compartment. The superposed compartments are in some examples orientated side-by-side. In some examples each individual unit dose article may have a weight of between 10 g and 40 g, or even between 15 g and 35 g. The water soluble film may be soluble or dispersible in water. Prior to be being formed into a unit dose article, the water-soluble film has in some examples a thickness of from 20 to 150 micron, in other examples 35 to 125 micron, in further examples 50 to 110 micron, in yet further examples about 76 micron. Example water soluble film materials comprise polymeric materials. The film material can, for example, be obtained by casting, blow-moulding, extrusion or blown extrusion of the polymeric material. In some examples, the water-soluble film comprises polyvinyl alcohol homopolymer or polyvinyl alcohol copolymer, for example a blend of polyvinylalcohol homopolymers and/or polyvinylalcohol copolymers, wherein the polyvinyl alcohol copolymers preferably are selected from sulphonated and carboxylated anionic polyvinylalcohol copolymers especially carboxylated anionic polyvinylalcohol copolymers, for example a blend of a polyvinylalcohol homopolymer and a carboxylated anionic polyvinylalcohol copolymer, alternatively a blend of two or more preferably two polyvinyl alcohol homopolymers. In some examples water soluble films are those supplied by Monosol under the trade references M 8630, M 8900, M 8779, M 8310. In some examples the film may be opaque, transparent or translucent. The film may comprise a printed area. The area of print may be achieved using techniques such as flexographic printing or inkjet printing. The film may comprise an aversive agent, for example a bittering agent. Suitable bittering agents include, but are not limited to, naringin, sucrose octaacetate, quinine hydrochloride, denatonium benzoate, or mixtures thereof. Example levels of aversive agent include, but are not limited to, 1 to 5000 ppm, 100 to 2500 ppm, or 250 to 2000 ppm. The water-soluble film or water-soluble unit dose article or both may be coated with a lubricating agent. In some examples, the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

The detergent composition may comprise a solid, a liquid or a mixture thereof. The term liquid includes a gel, a solution, a dispersion, a paste, or a mixture thereof. The solid may be a powder. By powder we herein mean that the detergent composition may comprise solid particulates or may be a single homogenous solid. In some examples, the powder detergent composition comprises particles. This means that the powder detergent composition comprises individual solid particles as opposed to the solid being a single homogenous solid. The particles may be free-flowing or may be compacted. A laundry detergent composition can be used in a fabric hand wash operation or may be used in an automatic machine fabric wash operation, for example in an automatic machine fabric wash operation. Example laundry detergent compositions comprise a non-soap surfactant, wherein the non-soap surfactant comprises an anionic non-soap surfactant and a non-ionic surfactant. In some examples, the laundry detergent composition comprises between 10% and 60%, or between 20% and 55% by weight of the laundry detergent composition of the non-soap surfactant. Example weight ratio of non-soap anionic surfactant to nonionic surfactant are from 1:1 to 20:1, from 1.5:1 to 17.5:1, from 2:1 to 15:1, or from 2.5:1 to 13:1. Example non-soap anionic surfactants comprises linear alkylbenzene sulphonate, alkyl sulphate anionic surfactant or a mixture thereof. Example weight ratio of linear alkylbenzene sulphonate to alkyl sulphate anionic surfactant are from 1:2 to 9:1, from 1:1 to 7:1, from 1:1 to 5:1, or from 1:1 to 4:1. Example linear alkylbenzene sulphonates are $C_{10}$-$C_{16}$ alkyl benzene sulfonic acids, or $C_{11}$-$C_{14}$ alkyl benzene sulfonic acids. By 'linear', we herein mean the alkyl group is linear. Example alkyl sulphate anionic surfactant may comprise alkoxylated alkyl sulphate or non-alkoxylated alkyl sulphate or a mixture thereof. Example alkoxylated alkyl sulphate anionic surfactant comprise an ethoxylated alkyl sulphate anionic surfactant. Example alkyl sulphate anionic surfactant may comprise an ethoxylated alkyl sulphate anionic surfactant with a mol average degree of ethoxylation from 1 to 5, from 1 to 3, or from 2 to 3. Example alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. Example alkyl fraction of the alkyl sulphate anionic surfactant are derived from fatty alcohols, oxo-synthesized alcohols, Guerbet alcohols, or mixtures thereof. In some examples, the laundry detergent composition comprises between 10% and 50%, between 15% and 45%, between 20% and 40%, or between 30% and 40% by weight of the laundry detergent composition of the non-soap anionic surfactant. In some examples, the non-ionic surfactant is selected from alcohol alkoxylate, an oxo-synthesised alcohol alkoxylate, Guerbet alcohol alkoxylates, alkyl phenol alcohol alkoxylates, or a mixture thereof. In some examples, the laundry detergent composition comprises between 0.01% and 10%, between 0.01% and 8%, between 0.1% and 6%, or between 0.15% and 5% by weight of the liquid laundry detergent composition of a non-ionic surfactant. In some examples, the laundry detergent composition comprises between 1.5% and 20%, between 2% and 15%, between 3% and 10%, or between 4% and 8% by weight of the laundry detergent composition of soap, in some examples a fatty acid salt, in some examples an amine neutralized fatty acid salt, wherein in some examples the amine is an alkanolamine for example selected from monoethanolamine, diethanolamine, triethanolamine or a mixture thereof, in some examples monoethanolamine. In some examples, the laundry detergent composition is a liquid laundry detergent composition. In some examples the liquid laundry detergent composition comprises less than 15%, or less than 12% by weight of the liquid laundry detergent composition of water. In some examples, the laundry detergent composition is a liquid laundry detergent composition comprising a non-aqueous solvent selected from 1,2-propanediol, dipropylene glycol, tripropyleneglycol, glycerol, sorbitol, polyethylene glycol or a mixture thereof. In some examples, the liquid laundry detergent composition comprises between 10% and 40%, or between 15% and 30% by weight of the liquid laundry detergent composition of the non-aqueous solvent. In some examples, the laundry detergent composition comprises a perfume. In some examples, the laundry detergent composition comprises an adjunct ingredient which can be selected from the group comprising builders including citrate, (encapsulated) enzymes including but not limited to proteases, amylases, lipases, cellulases, mannanases, xyloglucanases, DNA'ses, and mixtures thereof, bleach, bleach catalyst, aesthetic dye, hueing dye, brightener, cleaning polymers including alkoxylated polyamines and polyethyleneimines, soil release polymers, fabric conditioning polymers including Polyquaternium 10 (CathEC), further surfactant including amine oxide and solvent, chelants including aminocarboxylate and aminophosphonate chelants, dye transfer inhibitors, encapsulated perfume, polycarboxylates, structurant, pH trimming agents, antioxidants, preservatives, antibacterial agents including Tinosan H P100, probiotics, and mixtures thereof. In some examples, the laundry detergent composition has a pH between 6 and 10, between 6.5 and 8.9, or between 7 and 8, wherein the pH of the laundry detergent composition is measured as a 10% product concentration in demineralized water at 20° C. When liquid, the laundry detergent composition may be Newtonian or non-Newtonian. In some examples, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution. The liquid laundry detergent composition described herein can have any suitable viscosity depending on factors such as formulated ingredients and purpose of the composition.

The following are exemplary water soluble unit dose formulations. The composition can be part of a single chamber water soluble unit dose article or can be split over multiple compartments resulting in below "averaged across compartments" full article composition. The below composition is enclosed in a polyvinyl alcohol based water soluble film, more specifically a water soluble film comprising a blend of a polyvinylalcohol homopolymer and a carboxylated anionic polyvinylalcohol copolymer, alternatively a water soluble film comprising a carboxylated anionic polyvinylalcohol copolymer such as M 8630 or M 8310 ex the MonoSol company.

| Ingredients | Composition 1 (wt %) |
|---|---|
| Fatty alcohol ethoxylate non-ionic surfactant, $C_{12-14}$ average degree of ethoxylation of 7 | 3.8 |
| Lutensol XL100 | 0.5 |
| Linear $C_{11-14}$ alkylbenzene sulphonate | 24.6 |
| C12-14 AE3S Ethoxylated alkyl sulphate with an average degree of ethoxylation of 3 | 12.5 |
| Citric acid | 0.7 |
| Palm Kernel Fatty acid | 5.3 |
| Nuclease enzyme* (wt % active protein) | 0.01 |

-continued

| Ingredients | Composition 1 (wt %) |
|---|---|
| Protease enzyme (wt % active protein) | 0.07 |
| Amylase enzyme (wt % active protein) | 0.005 |
| Xyloglucanase enzyme (wt % active protein) | 0.005 |
| Mannanase enzyme (wt % active protein) | 0.003 |
| Ethoxylated polyethyleneimine** | 1.6 |
| Amphiphilic graft copolymer*** | 2.6 |
| Zwitterionic polyamine**** | 1.8 |
| Anionic polyester terephthalate***** | 0.6 |
| HEDP chelant | 2.2 |
| Brightener 49 | 0.4 |
| Silicone anti-foam | 0.3 |
| Hueing dye | 0.05 |
| 1,2 PropaneDiol | 12.3 |
| Glycerine | 4.7 |
| DPG (DiPropyleneGlycol) | 1.7 |
| TPG (TriPropyleneGlycol) | 0.1 |
| Sorbitol | 0.1 |
| Monoethanolamine | 10.2 |
| K2SO3 | 0.4 |
| MgCl2 | 0.3 |
| water | 10.8 |
| Hydrogenated castor oil | 0.1 |
| Perfume | 2.1 |
| Aesthetic dye & Minors | Balance to 100 |
| pH (10% product concentration in demineralized water at 20° C.) | 7.4 |

*Nuclease enzyme is as claimed in co-pending European application 19219568.3

**Lutensol FP620 ex BASF-ethoxylated polyethyleneimine (PEI600 EO20)

***polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains

****Lutensit Z96 (zwitterionic polyamine ex BASF-zwitterionic hexamethylene diamine according to below formula: 100% quaternized and about 40% of the polyethoxy (EO24) groups are sulfonated).

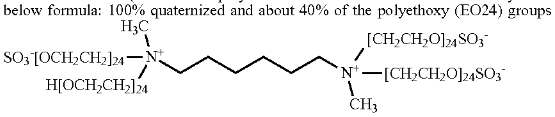

*****Texcare SRA300 ex Clariant

The following is a multi-compartment water soluble unit dose laundry article comprising a larger bottom compartment while having two smaller compartments in a side by side configuration superposed on top of the bottom compartment, following the Ariel 3-in-1 Pods design, as commercially available in the UK in January 2020. The below compositions are enclosed in a polyvinyl alcohol based water soluble outer film, more specifically a water soluble film comprising a blend of a polyvinylalcohol homopolymer and a carboxylated anionic polyvinylalcohol copolymer, and a water soluble middle film comprising a blend of polyvinyl alcohol homopolymers, alternatively a blend of a polyvinylalcohol homopolymer and a carboxylated anionic polyvinylalcohol copolymer.

| Ingredients | Full article Composition (wt %) | Bottom compartment Composition (wt %) | Top compartment Composition 1 (wt %) | Top compartment Composition 2 (wt %) |
|---|---|---|---|---|
| Volume | 25.5 ml | 22.3 ml | 1.6 ml | 1.6 ml |
| Fatty alcohol ethoxylate non-ionic surfactant, $C_{12-14}$ average degree of ethoxylation of 7 | 3.5 | 3.7 | 2.6 | 1.6 |
| Lutensol XL100 | 0.4 | 0.5 | — | — |
| Linear $C_{11-14}$ alkylbenzene sulphonate | 24.2 | 24.9 | 18.9 | 19.4 |
| C12-15 AE3S Ethoxylated alkyl sulphate with an average degree of ethoxylation of 3 | 12.3 | 12.6 | 9.7 | 9.7 |
| Citric acid | 0.7 | 0.7 | 0.5 | 0.5 |
| Palm Kernel Fatty acid | 5.2 | 5.4 | 4.1 | 4.1 |
| Nuclease enzyme* (wt % active protein) | 0.009 | 0.011 | — | — |
| Protease enzyme (wt % active protein) | 0.05 | 0.06 | — | — |
| Amylase enzyme (wt % active protein) | 0.004 | 0.005 | — | — |
| Xyloglucanase enzyme (wt % active protein) | 0.005 | — | 0.073 | — |
| Mannanase enzyme (wt % active protein) | 0.003 | 0.003 | — | — |

-continued

| Ingredients | Full article Composition (wt %) | Bottom compartment Composition (wt %) | Top compartment Composition 1 (wt %) | Top compartment Composition 2 (wt %) |
|---|---|---|---|---|
| Lipase enzyme (wt % active protein) | 0.012 | — | 0.187 | — |
| Ethoxylated polyethyleneimine** | 1.5 | 1.6 | 1.2 | 1.2 |
| Amphiphilic graft copolymer*** | 2.0 | 2.3 | — | — |
| Zwitterionic polyamine**** | 1.8 | 1.9 | 1.4 | 1.4 |
| Anionic polyester terephthalate***** | 0.4 | — | — | 5.8 |
| HEDP chelant | 2.2 | 2.2 | 1.7 | 1.7 |
| Brightener 49 | 0.3 | 0.4 | 0.01 | 0.01 |
| Silicone anti-foam | 0.3 | 0.3 | — | — |
| Hueing dye | 0.04 | — | 0.69 | — |
| 1,2 PropaneDiol | 13.6 | 12.8 | 11.3 | 26.4 |
| Glycerine | 6.0 | 5.0 | 17.3 | 8.3 |
| DPG (DiPropyleneGlycol) | 0.8 | 0.8 | 0.6 | 0.6 |
| TPG (TriPropyleneGlycol) | 0.06 | 0.06 | — | — |
| Sorbitol | 0.6 | 0.05 | 8.8 | — |
| Monoethanolamine | 10.0 | 10.4 | 7.9 | 8.0 |
| K2SO3 | 0.4 | 0.4 | 0.04 | 0.4 |
| MgCl2 | 0.3 | 0.3 | 0.2 | 0.2 |
| water | 10.9 | 10.9 | 11.8 | 9.9 |
| Hydrogenated castor oil | 0.1 | 0.1 | — | 0.1 |
| Perfume | 1.6 | 1.9 | — | — |
| Aesthetic dye & Minors (incl. preservative) | Balance to 100 | Balance to 100 | Balance to 100 | Balance to 100 |
| pH (10% product concentration in demineralized water at 20° C.) | 7.4 | 7.4 | 7.4 | 7.4 |

*Nuclease enzyme is as claimed in co-pending European application 19219568.3

**Lutensol FP620 ex BASF-ethoxylated polyethyleneimine (PEI600 E020)

***polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains

****Lutensit Z96 (zwitterionic polyamine ex BASF-zwitterionic hexamethylene diamine according to below formula: 100% quaternized and about 40% of the polyethoxy (EO24) groups are sulfonated).

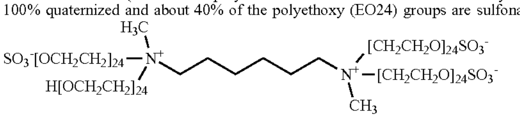

*****Texcare SRA300 ex Clariant

Method to Measure the Average Force Required to Open the Recloseable Zipper

Typically, to measure the opening force of the zipper, the sample is first closed and then clamped on a force measuring device (tensile tester) with the sample blocked on each clamp that have been positioned to keep the zipper closed. One of the 2 clamps (where a load cell is installed) is then moved away from the other clamp with a constant speed (100 mm/min) and the resistance measured by the load cell is recorded until the zipper is completely opened and the sample is fully separated. The average force required to open the recloseable zipper is recorded as the "peak" force recorded over the full experiment divided by the sample width (N/mm).

Method to Measure the Strength of the Heat Seal Between the Recloseable Zipper and the Polyethylene Layer Typically, to measure the zipper sealing force on the polyethylene layer, a sample is clamped on a force measuring device (tensile tester) so that the paper side is clamped on clamp #1 and the free edge of the zipper is clamped on clamp #2. Clamp #2 (where a load cell is installed) is then moved away from the other one with a constant speed (100 mm/min) and the resistance measured by the load cell is recorded until the zipper is fully separated from the polyethylene layer. The strength is recorded as the "peak" force recorded over the full experiment divided by the sample width (N/mm).

Combinations

1. A detergent product comprising a flexible bag and water-soluble detergent articles, wherein the water-soluble detergent articles are contained inside the flexible bag,
   wherein the flexible bag comprises:
   (a) from 85 wt % to 94 wt % of a paper layer;
   (b) from 3.0 wt % to 10.0 wt % of polyethylene layer having a thickness of from 6 μm to 20 μm; and
   (c) from 3.0 wt % to 10.0 wt % recloseable zipper,
   wherein the polyethylene layer is coated onto the paper layer,
   wherein the recloseable zipper is in contact with the polyethylene layer, and
   wherein the average force required to open the recloseable zipper is less than 4.0 newtons per centimeter.
2. A product according to embodiment 1, wherein the average force required to open the recloseable zipper is less than 3.0 newtons per centimeter.
3. A product according to any preceding embodiment, wherein the zipper is a hook-hook zipper.
4. A product according to embodiment 3, wherein the zipper comprises at least three rows of hooks.
5. A product according to embodiment 4, wherein the at least three rows of hooks are positioned one on top of each other in the vertical plane, with each row running substantially across the width of the flexible bag in the horizontal plane.

6. A product according to any of embodiments 3-5, wherein the hooks are mushroom shaped.
7. A product according to any preceding embodiment, wherein the flexible bag comprises at least 90 wt % of a paper layer.
8. A product according to any preceding embodiment, wherein the flexible bag comprises from 4.0 wt % to 8.0 wt % of a polyethylene layer.
9. A product according to any preceding embodiment, wherein the flexible bag comprises from 4.0 wt % to 8.0 wt % recloseable zipper.
10. A product according to any preceding embodiment, wherein the recloseable zipper is made from polyethylene.
11. A detergent product according to any preceding embodiment, wherein the paper layer has a thickness of from 50 μm to 200 μm.
12. A detergent product according to any preceding embodiment, wherein the paper layer has a weight of from 70 gsm to 200 gsm.
13. A detergent product according to any preceding embodiment, wherein there is no adhesive between the paper layer and polyethylene layer.
14. A detergent product according to any preceding embodiment, wherein the recloseable zipper is heat sealed to the polyethylene layer.
15. A detergent product according to any preceding embodiment, wherein an illustration is printed onto the paper layer.

EXAMPLES

The outer layer of the pack substrate is a 130 gsm K raft Paper. The inner layer (for sealing and barrier) is a 10 microns LDPE layer directly extruded (extrusion coating) on the paper substrate. Such composite substrate (Paper+LDPE) in forms of reels is converted into a "Stand up pouch" pack (SUP) on a customized Horizontal Form, Fill and Seal machine (HFFS) with a thermos-sealed PE zipper in the inside.

As used in this specification and the appended claims, the singular forms "a", "an", and "the" include plural references unless the content clearly dictates otherwise. Thus, for example, "a volatile material" may include more than one volatile material.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A detergent product comprising:

a flexible bag, wherein the flexible bag comprises:

from about 85 wt % to about 94 wt %, by weight of the flexible bag, of a paper layer;

from about 3.0 wt % to about 10.0 wt %, by weight of the flexible bag, of a polyethylene layer having a thickness of from about 6 μm to about 20 μm; and from about 3.0 wt % to about 10.0 wt %, by weight of the flexible bag, of a recloseable zipper, wherein:

the polyethylene layer is coated onto the paper layer, the recloseable zipper is in contact with the polyethylene layer, and an average force required to open the recloseable zipper is less than about 4.0 newtons per centimeter; and water-soluble detergent articles, wherein the water-soluble detergent articles are contained inside the flexible bag.

2. The product according to claim 1, wherein the average force required to open the recloseable zipper is less than about 3.0 newtons per centimeter.

3. The product according to claim 1, wherein the recloseable zipper is a hook-hook zipper.

4. The product according to claim 1, wherein the recloseable zipper comprises at least three rows of hooks.

5. The product according to claim 4, wherein each row of the at least three rows of hooks runs substantially across a width of the flexible bag in a horizonal plane, and the at least three rows of hooks are vertically aligned.

6. The product according to claim 1, wherein the recloseable zipper comprises hooks, and the hooks are mushroom shaped.

7. The product according to claim 1, wherein the flexible bag comprises at least about 90 wt % of the paper layer.

8. The product according to claim 1, wherein the flexible bag comprises from about 4.0 wt % to about 8.0 wt % of the polyethylene layer.

9. The product according to claim 1, wherein the flexible bag comprises from about 4.0 wt % to about 8.0 wt % of the recloseable zipper.

10. The product according to claim 1, wherein the recloseable zipper is made from polyethylene.

11. The product according to claim 1, wherein the paper layer has a thickness of from about 50 μm to about 200 μm.

12. The product according to claim 1, wherein the paper layer has a weight of from about 70 gsm to about 200 gsm.

13. The product according to claim 1, wherein there is no adhesive between the paper layer and the polyethylene layer.

14. The product according to claim 1, wherein the recloseable zipper is heat sealed to the polyethylene layer.

15. The product according to claim 14, wherein a heat seal strength between the recloseable zipper and the polyethylene layer is from about 10 N/inch to about 40 N/inch.

16. The product according to claim 1, wherein an illustration is printed onto the paper layer.

17. The product according to claim 1, wherein the flexible bag does not comprise any tear openings.

18. The product according to claim 1, wherein the polyethylene layer comprises low density polyethylene.

19. The product according to claim 1, wherein the water-soluble detergent articles comprise automatic dishwashing detergent pouches.

* * * * *